United States Patent
Gardner

(10) Patent No.: US 9,534,578 B2
(45) Date of Patent: Jan. 3, 2017

(54) DEVICE FOR CONVERTING KINETIC ENERGY OF A FLOWING WATER INTO KINETIC ENERGY OF A ROTATABLE ROTOR SHAFT

(75) Inventor: Fred Ernest Gardner, Zwaag (NL)

(73) Assignee: Tocardo International B.V., Zijdewind (NL)

( * ) Notice: Subject to any disclaimer, the term of this patent is extended or adjusted under 35 U.S.C. 154(b) by 850 days.

(21) Appl. No.: 12/675,425

(22) PCT Filed: Sep. 1, 2008

(86) PCT No.: PCT/NL2008/050577
§ 371 (c)(1),
(2), (4) Date: Apr. 19, 2010

(87) PCT Pub. No.: WO2009/031887
PCT Pub. Date: Mar. 12, 2009

(65) Prior Publication Data
US 2010/0244452 A1    Sep. 30, 2010

(30) Foreign Application Priority Data

Aug. 31, 2007 (NL) .................................... 2000840

(51) Int. Cl.
*F03B 13/26* (2006.01)
*F03B 3/04* (2006.01)
(Continued)

(52) U.S. Cl.
CPC ............... *F03B 13/264* (2013.01); *F03B 3/04* (2013.01); *F03B 13/14* (2013.01);
(Continued)

(58) Field of Classification Search
CPC ............. F03B 3/04; F03B 3/126; F03B 3/128; F03B 7/003; F03B 13/12; F03B 13/14;F03B 13/141; F03B 13/22; F03B 13/264; F03B 17/061; F03B 13/1825; F05B 2240/97; F05B 2210/404; F05B 2260/75; F05B 2260/74; F05B 2260/78; Y02E 10/18; Y02E 10/38
(Continued)

(56) References Cited

U.S. PATENT DOCUMENTS 1,834,888 A * 12/1931 Baughn .................... 416/131
3,342,272 A * 9/1967 Martin ....................... 416/39
(Continued)

FOREIGN PATENT DOCUMENTS

GB    2100810 A  *  1/1983
GB    2 392 713 A    3/2004
(Continued)

OTHER PUBLICATIONS

International Search Report for corresponding International Application No. PCT/NL2008/050577 mailed Nov. 25, 2008.
(Continued)

*Primary Examiner* — Dwayne J White
*Assistant Examiner* — Adam W Brown
(74) *Attorney, Agent, or Firm* — Renner, Otto, Boisselle & Sklar, LLP

(57) ABSTRACT

The invention relates to a device for converting kinetic energy of a flowing water into kinetic energy of a rotatable rotor shaft, wherein the device is adapted to be effective in a first flow direction and a second flow direction substantially opposite to the first, wherein the device comprises two rotor blades each connected to a blade shaft coupled to the rotor shaft for transfer of a torque relative to the rotor shaft, wherein the blades are each rigidly connected to their blade shaft, the blade shafts are mounted for rotation about their own axis relative to the rotor shaft, the blade shafts are coupled to each other for rotation in the same rotation
(Continued)

direction and the rotor blades each have an asymmetrical cross-section. There is hereby always flow against the asymmetrical rotor blades from the same direction relative to the blade during the energy conversion process, so that the profile of the rotor blades can be optimized for this flow direction.

5 Claims, 3 Drawing Sheets

(51) Int. Cl.
*F03B 13/22* (2006.01)
*F03B 13/14* (2006.01)
*F03B 13/18* (2006.01)

(52) U.S. Cl.
CPC .......... *F03B 13/1825* (2013.01); *F03B 13/22* (2013.01); *F05B 2210/404* (2013.01); *F05B 2240/97* (2013.01); *F05B 2260/74* (2013.01); *F05B 2260/75* (2013.01); *F05B 2260/78* (2013.01); *Y02E 10/28* (2013.01); *Y02E 10/38* (2013.01)

(58) Field of Classification Search
USPC ...... 415/26, 47, 48, 911; 416/6, 9, 147, 153, 416/204 R, 205, 246, 104, 105, 131, 140
See application file for complete search history.

(56) References Cited

U.S. PATENT DOCUMENTS

| 4,447,740 | A | * | 5/1984 | Heck ............................... 290/53 |
| 5,161,948 | A | * | 11/1992 | Carvalho et al. ............... 416/46 |
| 5,762,474 | A | | 6/1998 | Chatelain |
| 6,652,221 | B1 | * | 11/2003 | Praenkel ........................ 415/3.1 |
| 6,896,564 | B2 | * | 5/2005 | Willmot .......................... 440/50 |
| 7,075,191 | B2 | * | 7/2006 | Davison .......................... 290/54 |

FOREIGN PATENT DOCUMENTS

| GB | 2392713 A | * | 3/2004 |
| JP | 58-91304 | | 5/1983 |
| JP | 62-142863 | | 6/1987 |

OTHER PUBLICATIONS

Written Opinion for corresponding International Application No. PCT/NL2008/050577 mailed Nov. 25, 2008.

* cited by examiner

DEVICE FOR CONVERTING KINETIC ENERGY OF A FLOWING WATER INTO KINETIC ENERGY OF A ROTATABLE ROTOR SHAFT

This application is a national phase of International Application No. PCT/NL2008/050577 filed Sep. 1, 2008 and published in the English language.

The invention relates to a device for converting kinetic energy of a flowing water into kinetic energy of a rotatable rotor shaft, wherein the device is adapted to be effective in a first flow direction and a second flow direction substantially opposite to the first, wherein the device comprises: two rotor blades each connected to a blade shaft coupled to the rotor shaft for transfer of a torque relative to the rotor shaft.

Such an installation forms the subject-matter of the non-prepublished Netherlands patent application NL-2000150 which describes a water turbine adapted for use under water, together with a generator.

There is an increasing demand for energy, and in particular for environmentally-friendly energy. One of the sources of environmentally-friendly energy is the tidal movement of the sea. Tidal power stations make use of the vertical or horizontal water flows resulting from ebb and flow movement of the water to convert kinetic energy into electrical energy. An underwater turbine with rotor blades can thus be placed in an area where a clear difference in water level can be discerned between high water (highest water level during high tide) and low water (lowest water level during low tide) with associated strong horizontal water flow. A great advantage of this method of energy conversion relative to wind energy is that the flow characteristics are more readily predictable and more constant. Owing to the much greater density of water relative to air a greater force is also exerted on the rotor blades, and the size of a turbine can remain limited. Another advantage is that the turbine can also rotate more slowly in order to obtain the same power.

Applied in this known device are symmetrical rotor blades, which are known not to provide an optimal efficiency. Although it is hereby possible to convert the kinetic energy of the water into kinetic energy of the rotor in both the flow directions of the water occurring in tides, the efficiency is only mediocre in both directions since the design of the rotor blades is a compromise.

The object of the present invention is to provide such a device with an improved efficiency.

The invention provides for this purpose a device of the type stated in the preamble, characterized in that the rotor blades are each rigidly connected to their blade shaft, that the blade shafts are each mounted for rotation about their own axis relative to the rotor shaft, that the blade shafts are coupled to each other for rotation in the same rotation direction relative to the same axis, and that the rotor blades each have an asymmetrical cross-section.

This differs from the rotation of the rotor blades which does occur in turbines, wherein the blade shafts are each rotatable about their own axis, and in the same direction relative to this axis, but in a mutually differing direction because the shafts each extend in a different radial direction. Such a turbine is described in JP-A-62 142 863.

As a result of these measures there is always flow against the asymmetrical rotor blades from the same direction relative to the blade during the energy conversion process, so that the profile of the rotor blades can be optimized for this flow direction, whereby a higher efficiency can be achieved. Possible torques which are exerted on the blade shafts by the blades and which are in opposite directions as a result of the substantial symmetry of the construction are herein equalized by the connection between the blade shafts.

The blades are preferably also constructed such that the rotor blades are stable in a first position in a first flow direction and the rotor blades are stable in the second position in the opposite flow direction so that, after the reversal of the flow direction, for instance in the transition between low and high tide, the rotor blades become unstable in their original position and in the case of a disturbance move to the other position. It is noted here that the measure that the blade shafts are coupled to each other for rotation in the same rotation direction assumes from a mathematical viewpoint that the blade shafts extend parallel to each other. The scope of the present invention is based on the fact that the rotation direction of the blade shafts can also correspond in the case of blade shafts which each extend at an obtuse angle to the rotor shaft.

According to a first preferred embodiment the blade shafts each extend perpendicularly of the rotor shaft. This results in a greatly simplified construction.

The invention therefore also relates to a method for converting kinetic energy of a flowing water into kinetic energy of a rotatable rotor shaft, wherein the water can flow alternately in a first flow direction and in a second flow direction substantially opposite to the first, and wherein the flowing water exerts a force on rotor blades which exert a torque on the rotor shaft via a blade shaft, wherein a change in the flow direction causes the rotor blades to change position.

For assembly purposes it can be advantageous to work with smaller components. Transport is for instance hereby facilitated. In a further embodiment the device according to the invention is provided for this purpose with blade shafts placed at a distance from each other transversely of the blade shaft direction, wherein the blade shafts are coupled for rotation. This coupling serves to provide the above stated equalization of the torques exerted on the blade shafts by the blades. This coupling can be embodied by a crank-rod connection, by a gear rack connection or by a gear connection with an intermediate gear.

Devices for converting kinetic energy of a flowing water into kinetic energy of a rotatable rotor shaft are normally placed in a seawater environment, wherein the seawater acts on the device, which entails regular maintenance and inspection. A embodiment of such a device which is simpler while retaining effectiveness therefore has advantages. According to a preferred embodiment the two rotor blades are connected rigidly to the same blade shaft.

After a change in flow direction the two blades will reverse simultaneously from a first position, effective for a first flow direction, to a second position, effective for a substantially opposite, second flow direction. At the moment that reversing must take place the rate of flow is very low, as is therefore the pressure exerted on the rotor blades by the water flow. In order to then still cause reversing to take place the torque of the water pressure on the blade shaft must be as great as possible. It is therefore advantageous to place the blade shaft at a distance from the torque point of the rotor blade profile because the arm of the torque is hereby increased and an effective reversal can also be achieved at a low pressure. This embodiment also provides a method of the above stated type, wherein the change in position of the blades is caused by reversal of the flow direction.

When the torsion on the blade shafts resulting from forces of the water flow is reduced, the construction can be lighter. In an advantageous embodiment the device according to the invention is characterized in that the blade shaft runs through the torque point of the blade profile.

At a change in flow direction from a first flow direction to a second, substantially opposite flow direction the rotor blades must be reversed in order to become more effective for this second flow direction. During this change in flow direction the rate of flow is however very low, and so therefore is the pressure exerted on the rotor blades by the water flow. In order to achieve an effective reversal despite these sub-optimal conditions, a preferred embodiment provides the measure that the device according to the invention comprises reversing means for this purpose. These reversing means are adapted to forcibly reverse the blade shafts at tidal extremes. For control of these reversing means use can be made of a tide table, which is for instance stored in a memory, but also of a flow meter which is adapted to determine that the rate of flow is equal to zero. This embodiment moreover comprises a method wherein the change in the position of the blades is performed by reversing means.

Although it will be apparent that the configuration of the invention is symmetrical, mainly for the purpose of equalizing the torques acting on the blade shaft, it can be attractive for a slight degree of asymmetry to be present for the purpose of enhancing the reversal, particularly when no other means are provided for reversing the rotor blades from the one position to the other.

According to a specific preferred embodiment, the rotor shaft takes a hollow form and the reversing means comprise a reversing shaft which extends through the rotor shaft and which is coupled to the blade shaft by means of a gear transmission, as well as drive means for driving the reversing shaft in rotation. The reversing process can be performed by activating the drive means. It is important here that the reversing shaft can rotate freely during the energy conversion process in order to then prevent disruption of the transfer of forces. This further provides an enclosed embodiment which is thus protected against the seawater.

During the normal energy conversion process the blades will be in a position of equilibrium, which will also fluctuate as a result of natural fluctuations in the flow. The blade shaft will hereby carry out small rotating movements. This results in wear. In order to prevent this the device comprises according to a preferred embodiment arresting means for arresting the rotor blades in the first and second position.

In their simplest form the arresting means comprise a first stop and a second stop for bounding the movement of the rotor blades between the first position and the second position via the same path. These stops have a simple construction. They can be placed for the purpose of wholly preventing movements of the blade shaft outside the reversing movement, but also for the purpose of allowing a limited movement.

The arresting means can however also comprise at least a ratchet which is movable between a position which blocks the movement of the rotor blade relative to the blade shaft and a position which allows the movement of the rotor blade relative to the blade shaft. The blocking position can preferably be taken up in either position of the blade shaft. Two cavities corresponding to the two positions of the blade shaft can be arranged for this purpose, in each of which the ratchet can enter the cavity, although it is also possible for two ratchets to be arranged, each of which can enter a single cavity in one of the positions of the blade shaft. The cavity can here be placed in the blade shaft as well as in the bearing of the blade shaft. The ratchet is then always placed in the opposite element.

According to a further preferred embodiment, urging means are provided for urging the ratchet to the blocking position. These urging means can be formed by a spring. The urging means are herein adapted to generate a force such that the ratchet only exits the relevant cavity at those forces which occur when the flow direction of the water reverses.

According to an alternative embodiment, the device comprises activating means for moving the ratchet from the blocking position to the release position when activated.

The control of the activating means here preferably takes place subject to the control of the reversing means.

The invention also relates to such a device for converting kinetic energy of a flowing water into electrical energy, comprising a device of the above stated type, the rotor shaft of which is coupled to an electric generator.

The present invention will now be elucidated with reference to the accompanying drawings, in which.

Figure 1:
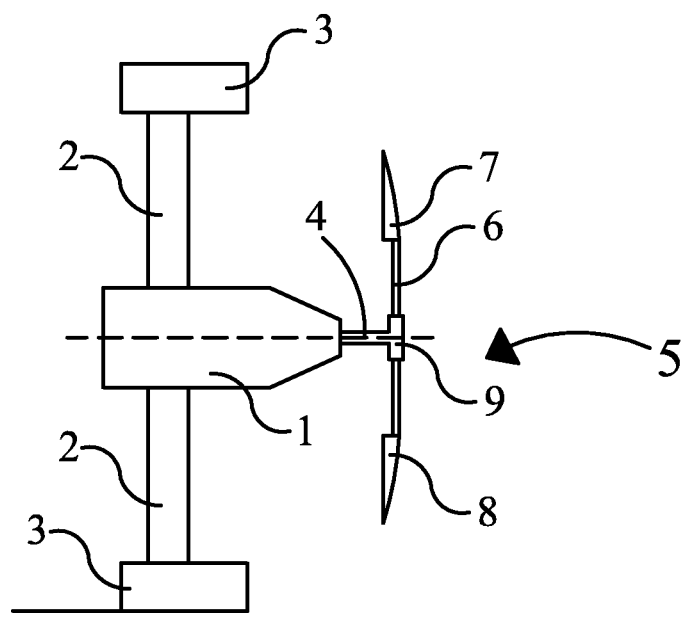
FIG. 1 is a cross-sectional view of a device for converting kinetic energy of flowing water into electrical energy.

FIG. 1 shows a generator 1 which is mounted in a support construction situated below the sea surface. The support construction comprises vertical elements 2 which are directly connected to the generator, and horizontal elements 3. Generator 1 comprises a rotor shaft 4 to which a water turbine, designated as a whole with 5, is connected. The water turbine comprises a blade shaft 6 which is connected rigidly on either side to a turbine blade 7, 8 respectively. Mounted on the end of rotor shaft 4 is a sleeve 9, the axis of which extends transversely of the rotor shaft and in which the blade shaft 6 is rotatably mounted.

Figure 2:
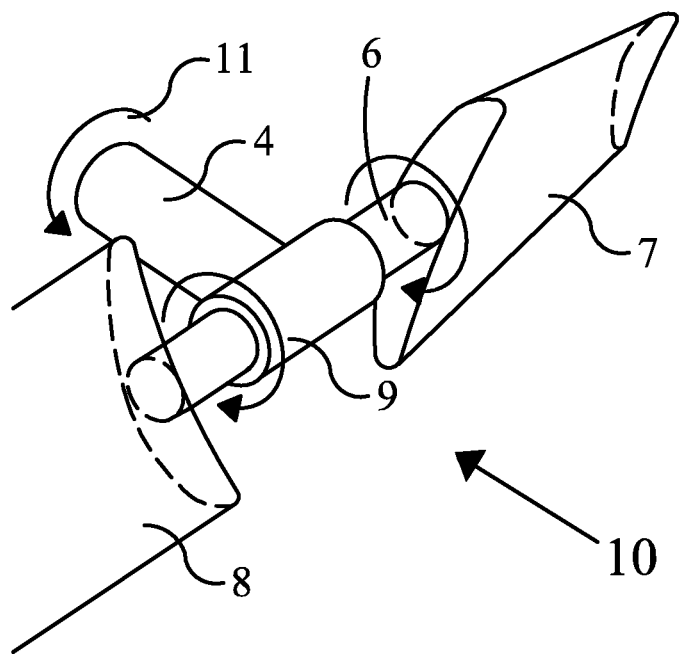
FIG. 2 is a schematic perspective view of a device for converting kinetic energy of flowing water into kinetic energy of a rotor shall.

The water turbine is shown in more detail in FIG. 2. During the normal operation of the turbine, wherein the water flows in the direction of arrow 10 and the blades are situated in the position shown in FIG. 2, the water flow exerts a pressure on blades 7 and 8, whereby rotor shaft 4 will rotate in the direction indicated with arrow 11. In this embodiment blades 7 and 8 are mounted on blade shaft 6 such that the point of engagement of the water pressure exerted on blades 7, 8 by the flowing water is intersected by the axis of blade shaft 6 or is situated at least a short distance therefrom in the optimal position of blades 7, 8. The connection between blade shaft and blades hereby does not have to transfer any torque, or only a little, via blade shaft 6 so that this latter can have small dimensions.

Figure 3:
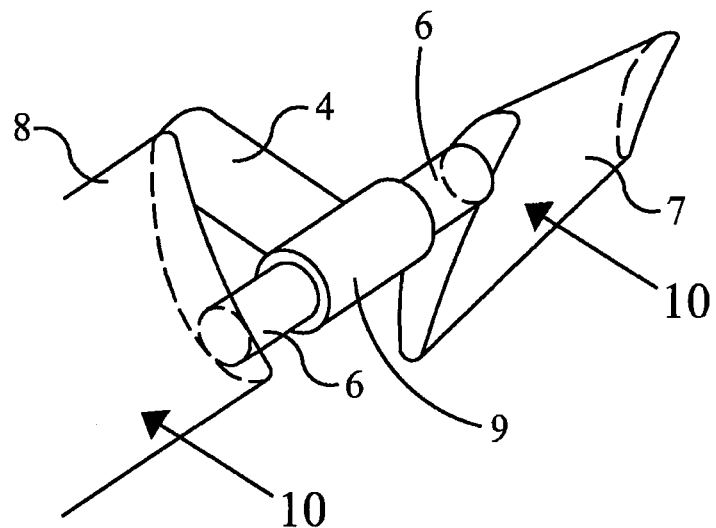
FIG. 3 is a schematic perspective view of a variant of the device shown in FIG. 2.

In the alternative construction shown in FIG. 3 this is not the case; blades 7 and 8 are mounted here on blade shaft 6 such that the point of engagement of the water pressure exerted on blades 7, 8 by the flowing water lies a considerable distance from the blade shaft in the optimal position of blades 7, 8. Although this requires a heavier construction of the connection between the blade shaft and the blades, this configuration has the advantage that the reversal of the blades can more easily take place automatically when the flow direction reverses.

Figures 4A, 4B:
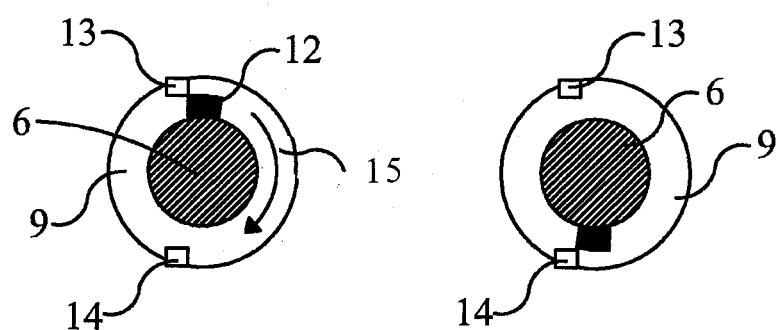
FIGS. 4A and 4B are cross-sectional views of the blade shaft of the preferred embodiment shown in FIGS. 2 and 3.

FIGS. 4A and 4B show a cross-section of blade shaft 6 a short distance from the sleeve 9 in which it is bearing-mounted. These figures show that a protrusion 12 is arranged on blade shaft 6. In the position shown in FIG. 4A, which is associated with a first flow direction of the water, protrusion 12 rests against a first stop 13, while in the position shown in FIG. 4B protrusion 12 rests against second stop 14. This latter position is associated with the second flow direction. It will be apparent that the movement of the blade shaft, and thereby that of the blades mounted thereon, can take place only via the path indicated by arrow 15.

Figure 5A:
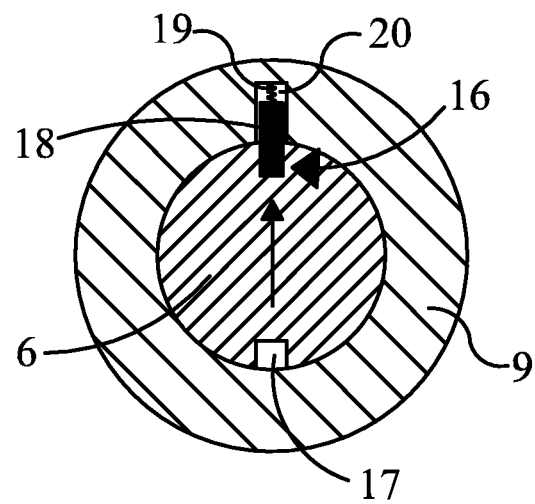
FIGS. 5A and 5B are cross-sectional views of the blade shaft according to an alternative embodiment.
Figure 5B:
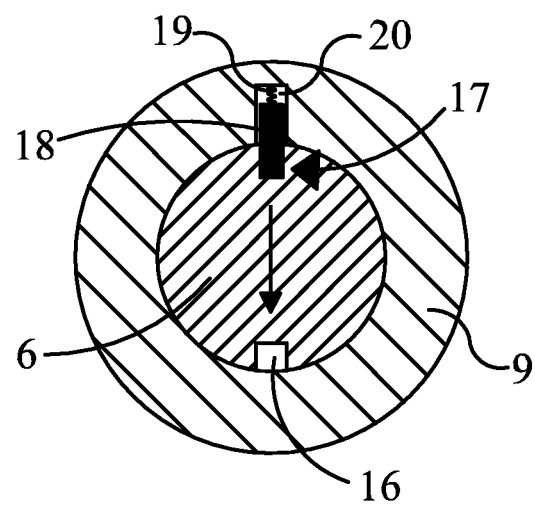

Finally, FIGS. 5A and 5B show an alternative embodiment of arresting means in the form of two cavities 16,17 arranged in blade shaft 6 and a pin 18 connected to sleeve 9 and movable in the radial direction of the blade shaft. Pin 18 is received in a cavity 20 arranged in sleeve 9, and pin 18 is urged into cavity 16 by means of a spring 19 arranged in cavity 20, whereby arresting takes place in the position shown in the drawing. FIG. 5B shows the corresponding position for the other flow direction, wherein pin 18 is moved into cavity 17. In both figures the rotation position of blade shaft 6 relative to sleeve 9 is shown by an arrow 21. As elucidated, these arresting means can be dimensioned for automatic release when the flow direction changes, although they can also be provided with activating means for controlled release at the point in time the flow direction changes. It will likewise be apparent to a skilled person that the positions of pin and cavities in respectively the sleeve and blade shaft can be switched. Not precluded either are further variations in the construction of the arresting means, nor variations in the overall construction of the shown embodiments of the invention.

The invention claimed is:

1. A device for converting kinetic energy of a flowing water into electrical energy, wherein the device is adapted to be effective in a first flow direction and in a second flow direction substantially opposite to the first, wherein the device comprises:
   a rotatable rotor shaft;
   an electrical generator coupled to the rotor shaft;
   a single blade shaft extending perpendicular to and mounted to the rotor shaft to allow rotation of the blade shaft around its own axis and to transfer torque in rotation around the rotor axis from the blade shaft to the rotor shaft;
   two rotor blades, each rigidly mounted to the same blade shaft at either side of the connection of the blade shaft to the rotor shaft, the rotor blades being oriented in opposite directions and the rotor blades both have an asymmetrical cross-section,
   wherein the blade shaft is placed at a distance from the torque point of the rotor blade profile, and
   wherein the two rotor blades are configured to simultaneously rotate along the axis of the blade shaft from a first position corresponding to a first flowing water direction to a second position corresponding to a substantially opposite second flowing water direction.

2. A device as claimed in claim 1, wherein the rotor blades have chordwise widths which are larger than a quarter of their radial lengths.

3. Method for converting kinetic energy of a flowing water into electrical energy of a rotatable rotor shaft, wherein the water can flow alternately in a first flow direction and in a second flow direction substantially opposite to the first, and wherein the flowing water exerts a force on two rotor blades each rigidly mounted to a single blade shaft extending perpendicular to and mounted to a rotor shaft connected to an electrical generator wherein the two blades exert a torque on the rotor shaft via the blade shaft, allowing rotation of the blade shaft around its own axis when the flow direction of the flowing water reverses.

4. Method as claimed in claim 3, wherein the change in rotation position of the blades is caused by reversal of the flow direction.

5. A method as claimed in claim 3, wherein the flowing water exerts its pressure on rotor blades having chordwise widths which are greater than a quarter of their radial lengths.

\* \* \* \* \*